United States Patent
Apfel et al.

(10) Patent No.: US 8,214,464 B2
(45) Date of Patent: *Jul. 3, 2012

(54) CURRENT UPDATES

(75) Inventors: Darren A. Apfel, Redmond, WA (US); Jon Friedman, Seattle, WA (US); Justin Michael Maguire, Seattle, WA (US); Matthew James Schoenholz, Austin, TX (US); Rosanna H. Ho, Kirkland, WA (US); Keith L. Rowe, Seattle, WA (US); Sandra I. Vargas, Sammamish, WA (US); Peter A. Bernard, Bellevue, WA (US); Matthew Justin Von Bencke, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,325

(22) Filed: Jun. 30, 2011

(65) Prior Publication Data

US 2011/0258553 A1 Oct. 20, 2011

Related U.S. Application Data

(63) Continuation of application No. 12/017,906, filed on Jan. 22, 2008, now Pat. No. 8,005,927.

(51) Int. Cl.
*G06F 15/16* (2006.01)

(52) U.S. Cl. ........ 709/219; 709/203; 709/227; 709/217; 707/611; 707/618

(58) Field of Classification Search .................. 707/618, 707/611; 709/203, 217.227, 219

See application file for complete search history.

(56) References Cited

U.S. PATENT DOCUMENTS

| | | | |
|---|---|---|---|
| 6,324,544 B1 | 11/2001 | Alam et al. | |
| 6,400,381 B1 | 6/2002 | Barrett et al. | |
| 7,275,215 B2 | 9/2007 | Werndorfer et al. | |
| 7,873,356 B2 * | 1/2011 | Flynt et al. | 455/418 |
| 8,005,927 B2 | 8/2011 | Apfel et al. | |
| 2003/0065738 A1 | 4/2003 | Yang et al. | |
| 2004/0117443 A1 | 6/2004 | Barsness | |
| 2004/0196315 A1 | 10/2004 | Swearingen et al. | |
| 2004/0204085 A1 | 10/2004 | Vargas et al. | |
| 2005/0027716 A1 * | 2/2005 | Apfel | 707/100 |
| 2005/0108348 A1 | 5/2005 | Lee | |
| 2005/0144538 A1 | 6/2005 | Lawrence et al. | |
| 2006/0031772 A1 | 2/2006 | Valeski | |
| 2006/0167991 A1 | 7/2006 | Heikes et al. | |

(Continued)

OTHER PUBLICATIONS

"Final Office Action", U.S. Appl. No. 12/017,906, (Sep. 9, 2010), 27 pages.

(Continued)

*Primary Examiner* — Wing Chan
*Assistant Examiner* — Hitesh Patel
(74) *Attorney, Agent, or Firm* — Wolfe-SBMC

(57) ABSTRACT

This document describes tools capable of differentiating a superset of entities from which a user may receive current updates effective to provide current updates for only some of the entities of the superset. In one embodiment, for example, the tools enable a user of a mobile device to select a set of entities from which the user will automatically receive updates that are current, easily accessible, and visible at-a-glance. The tools may forgo providing current updates for entities that are not selected by the user, though the tools may provide these updates when explicitly requested by the user or at particular times or events.

17 Claims, 11 Drawing Sheets

U.S. PATENT DOCUMENTS

| | | |
|---|---|---|
| 2006/0240856 A1 | 10/2006 | Counts et al. |
| 2007/0043822 A1 | 2/2007 | Brumfield |
| 2007/0067324 A1 | 3/2007 | Burkhardt |
| 2007/0182367 A1 | 8/2007 | Partovi |
| 2007/0220552 A1 | 9/2007 | Juster et al. |
| 2008/0172373 A1* | 7/2008 | Jenson et al. ............... 707/5 |
| 2008/0256170 A1* | 10/2008 | Hayashi et al. ............ 709/201 |
| 2009/0187621 A1 | 7/2009 | Apfel et al. |

OTHER PUBLICATIONS

"Friendvox", Retrieved on: <friendvox.com/faq.php> on Oct. 31, 2007, p. 1.

"Non-Final Office Action", U.S. Appl. No. 12/017,906, (Nov. 17, 2009),17 pages.

"Non-Final Office Action", U.S. Appl. No. 12/017,906, (Feb. 2, 2011),30 pages.

"Non-Final Office Action", U.S. Appl. No. 12/017,906, (May 12, 2010),22 pages.

"Notice of Allowance", U.S. Appl. No. 12/017,906, (May 16, 2011),7 pages.

"Sun Java System Instant Messaging", janua.fr/doc/SJS-Instant-Messaging.pdf, (Jan. 2005),pp. 1-6.

Fried, Ina "Microsoft Wants to Know Who Your Friends Are", Retrieved from: <news.com/2100-1008_3-5170109.html> on Oct. 31, 2007, (Mar. 4, 2004),3 pages.

Missig, Julian et al., "iChat Thought Bubbles", Retrieved from: <missig.org/julian/projects/jabber/iChat/> on Oct. 31, 2007, (Sep. 19, 2002),8 pages.

* cited by examiner

CURRENT UPDATES

CROSS-REFERENCE

This application is a continuation of and claims priority under 35 U.S.C. §120 to U.S. patent application Ser. No. 12/017,906, filed on Jan. 22, 2008 and titled "Current Updates," which issued on Aug. 23, 2011 as U.S. Pat. No. 8,005,927, the disclosure of which is incorporated by reference in its entirety herein.

BACKGROUND

Current mobile communication systems and devices, such as cellular networks and phones, permit users to receive updates for people, news sources, and other entities. Typically, these systems and devices provide updates for every person or other entity listed by the user, such as all of the people on a user's contact list and all the news feeds to which a user subscribes.

More and more, however, users' contact lists and news feeds may include many, many entities and receive many, many updates. Some users receive hundreds of updates a day from people on their contact lists and dozens more from news feeds.

The sheer number of updates received is often more than a user can keep up with. A user may receive updates for 100 different contacts (e.g., those on a "friends" list common to social-networking websites). Many people do not have the time or the interest to wade through all this information. Yet users often feel social pressure not to remove people from their contact lists. Removing or refusing to accept a new "friend" to a contact list is often considered rude.

Furthermore, many users receive too many updates from information sites, such as news and sports sites. A user may subscribe to a sports website but really only want up-to-date information on one team, even though he or she may want updates for other teams once in a while.

Further still, these updates may tax the resources of current mobile communication systems and devices. Current communication systems may use significant communication bandwidth to provide so many updates to a user's mobile device. Current mobile devices may use significant power to receive these updates as well, which may drain these devices' batteries more quickly than users may like.

SUMMARY

This document describes tools capable of differentiating a superset of entities from which a user may receive current updates effective to provide current updates for only some of the entities of the superset. In one embodiment, for example, the tools enable a user of a mobile device to select a set of entities from which the user will automatically receive updates that are current, easily accessible, and visible at-a-glance. The tools may forgo providing current updates for entities that are not selected by the user, though the tools may provide these updates when explicitly requested by the user or at particular times or events.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
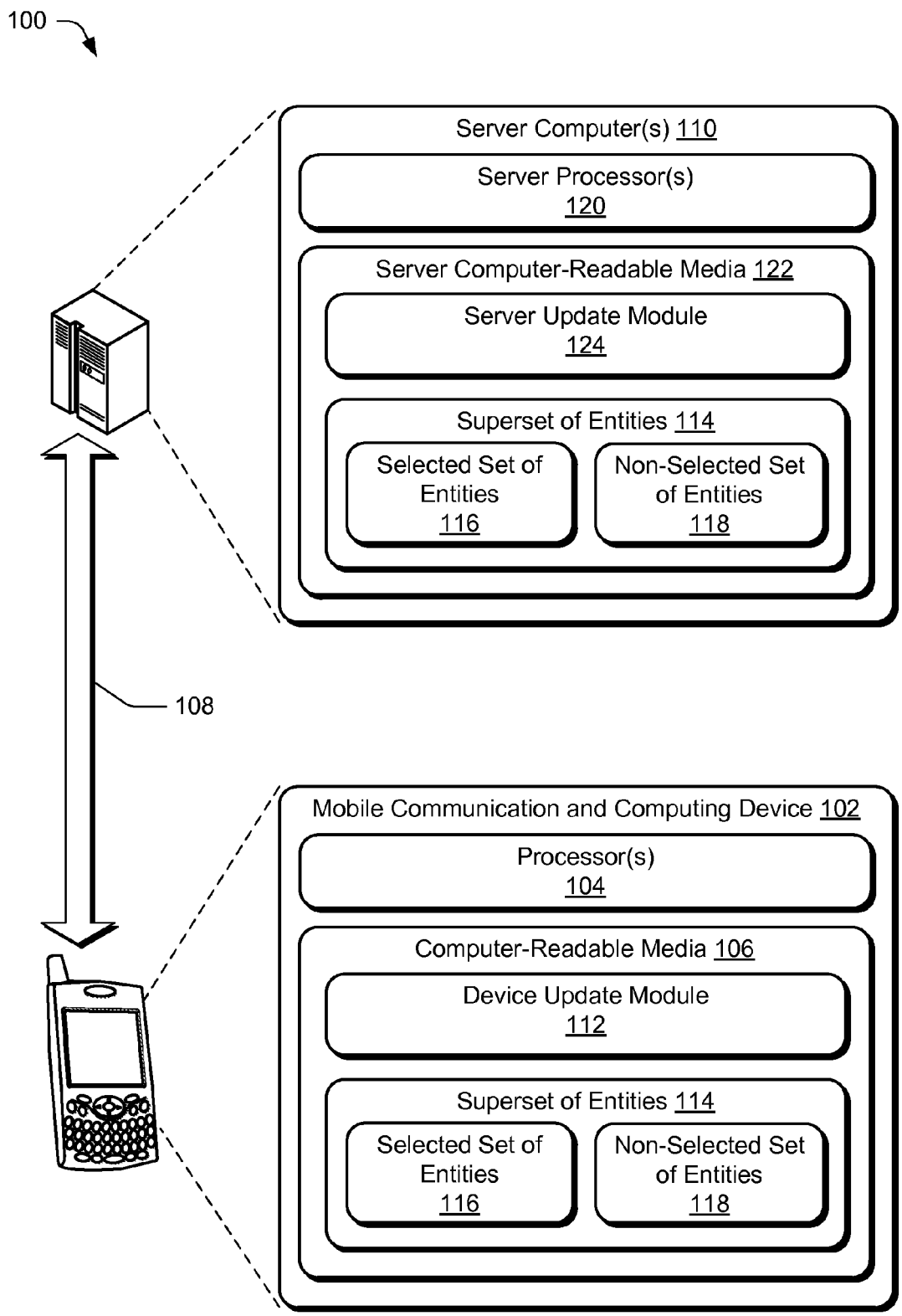
FIG. 1 is an illustration of an environment in which an example implementation of the tools may enable differentiation of a superset of entities from which a user may receive current updates effective to provide current updates for some of the entities of the superset.

Some communication systems and devices provide current updates for entities associated with a user, such as people on the user's friends list and news feeds subscribed to by the user. This can tax a user's time and interest. Further, as these current updates may in the future be provided by mobile communication systems and devices (e.g., cellular networks and phones), not only will these updates likely tax a user's time and interest, they may also tax the battery of a user's mobile device and the mobile network's communication bandwidth.

Consider for example Lydia Anderson, a cellular-phone user. She has a community friends list of 186 people and subscribes to 14 update feeds. Assume that all of these entities are known to her cellular phone and the phone network. Some of her friends send updates on their lives and interests often—Cindy is a prodigious updater and sends 10 to 15 updates a day. But Lydia does not know Cindy all that well or want to read that many updates a day. Compound this with some 185 other friends for which she gets updates. Add to this Lydia's news-feeds updates and Lydia may receive 500 or more updates a day to her cellular phone. Lydia simply doesn't have the time or interest to read all these updates and her phone battery dies too fast because it expends power to receive these 500 updates. Further still, the cellular-phone network is taxed sending all these updates, especially when it does so for its many cellular-phone users that receive updates.

The tools described in this document enable Lydia to differentiate between friends, feeds, and other entities associated with her so that she receives current updates for only some of them. The tools, in one embodiment, enable Lydia to automatically receive updates that are current, easily accessible, and visible at-a-glance for some entities while not being burdened with updates from some other entities. Thus, Lydia may receive updates that are current, easily accessible, and visible-at-a-glance for her friends Arjune, Brittany, Calvin, DeMarcus, and Elle, as well as for some of her news feeds, but not updates for the rest of her friends and news feeds. If Lydia decides to read, view, or browse updates for other people or feeds, such as Cindy's updates, she may explicitly choose to view those entities' updates when convenient to Lydia, such as when Lydia's phone is on a free network like Wi-Fi (e.g., a network that provides communication to a mobile device at no cost to the mobile device's user), is not solely on battery power (e.g., is plugged into a charger), or Lydia has the time to read about Cindy's many actions and interests.

In the following discussion, an example environment is first described in which the tools may enable a mobile-device user to differentiate between entities of a superset of entities from which a user may receive current updates effective to provide current updates for only some of the entities of the superset, as well as other actions. Example procedures and interfaces are then described that may be employed in the example environment, as well as in other environments. Although these tools are described as employed within a mobile communication network and device environment in the following discussion, it should be readily apparent that these tools may be incorporated within a variety of environments without departing from the spirit and scope thereof.

Example Environment

FIG. 1 is an illustration of an environment 100 in an example implementation in which the tools may differentiate and/or provide updates for some of a superset of entities associated with a user. Environment 100 includes a mobile communication and computing device (a "mobile device") 102 including one or more processor(s) 104 and computer-readable media 106. The mobile device may be communicatively coupled, through communication network 108, with server computer(s) 110. Although a single communication network 108 is shown, it may represent a single network or multiple networks. For example, communication network 108 may be representative of a cellular-phone network, an Internet Protocol (IP) network, and/or other network or group of networks capable of communicating wirelessly at least in part.

Mobile device 102 may be configured in a variety of ways. For example, the mobile device may be configured as a computer that is capable of communicating over communication network 108, such as a cellular phone or other mobile-communication-enabled device (e.g., a media player, personal digital assistant, or laptop computer). For purposes of the following discussion, the mobile device may also relate to a person that operates the mobile device. In other words, mobile device 102 may describe a logical mobile device that includes a user, software, and/or a machine. In the following discussion, the mobile device may represent one or more entities and therefore reference may be made to a single entity (e.g., mobile device 102) or multiple entities (e.g., mobile devices 102).

Mobile device 102 includes computer-readable media 106, which includes a device update module 112 and a superset of entities 114 associated with the user. The superset is shown here including a selected set of entities 116 and a non-selected set of entities 118.

Device update module 112 is capable of enabling and receiving selection or other differentiation between entities of the superset of entities, explicit selection of an entity of non-selected set of entities 118, determining and communicating indications or requests for updates for entities of non-selected set of entities 118, providing updates for selected entities that are current, in real-time, automatic, without user interaction, and/or in a particular display or orientation, and/or other actions and capabilities described herein.

Superset of entities 114 includes entities associated with a user, such as the user of mobile device 102, at least some entities for which current updates are receivable or may be selected to be receivable at mobile device 102.

An entity of the superset of entities may be a person, a group of persons, an update feed, a library, a website, or an application, to name a few. A person may be a user and/or his or her communication device, such as a text-message-receiving cellular phone, a land or wireless phone, a laptop configured to receive instant messages or calls, and so forth. An entity may be a group of persons when all of the persons may be communicated with at once, such as through an email, text-message, or conference call from mobile device 102.

An update feed may be any source that sends or makes available information in the form of updates, such as a news website, blog, and the like. A library may be a particular set of information, such as a photo album, play list of songs or music videos, and the like. An application entity may be a software program or other executable code capable of receiving updates and performing functions on mobile device 102, such as gaming software that can be updated, music software that can receive new songs or entertainment content in the form of automatic updates, and the like.

Superset of entities 114 is shown including selected set of entities 116 and non-selected set of entities 118. This is to show by way of illustration that entities making up either of these sets may be those selected from the superset of entities. An entity may be selected, however, from various sources and stored separate from the superset of entities.

Turning now to server computer(s) 110, these device(s) are capable of communicating with a mobile device, including through network 108, and with sources of updates, such as websites, RSS (e.g., news and blog) feeds, entities or entities' devices. The server computer(s) are also capable of other actions described herein.

The server computer(s) include processor(s) 120 and computer-readable media 122. The media includes a server update module 124 and superset of entities 114 having selected set of entities 116 and non-selected set of entities 118 (the sets similar or identical to those of mobile device 102).

Server update module 124 is capable of receiving selected entities or other information sufficient to differentiate selected entities from non-selected entities of the superset of entities. Based on this information, the server update module provides current updates for selected entities to mobile device 102 and forgoes providing current updates for non-selected entities, except in some cases responsive to receiving a user selection, indication, or request or on occurrence of an event. Ways in which the server update module and other elements of the server computer(s) act and interact are described in greater breadth and detail below.

Mobile device 102 and server computer(s) 110 are illustrated as executing modules on processor(s) 104 or 120, respectively. These processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, media 106 and/or 122 may include a wide variety of types and combinations of memory, such as random access memory (RAM), hard disk memory, removable medium memory, and other types of computer-readable storage media.

Note also that one or more of the elements shown in FIG. 1 may be further divided (e.g., device update module 112 or server update module 124), combined, and so on. Thus the environment 100 of FIG. 1 is illustrative of one of a plurality of different environments that may employ the described techniques.

Generally, any of the actions, operations, and/or functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, a module may represent program code that performs specified tasks when executed on a processor (e.g., CPU or CPUs). The program code can be stored in one or more computer-readable memory devices, such as computer-readable media 106 or 122. The features and techniques of the tools are platform-independent, meaning that they may be implemented on a variety of commercial computing platforms having a variety of processors.

Example Procedure with User Selection

The following discussion describes ways in which the tools may operate to enable differentiation between entities of a superset of entities effective to enable provision of current updates for some entities of the superset and forgo provision of current updates for some other entities of the superset, as well as other actions. Aspects of this procedure may be implemented in hardware, firmware, or software, or a combination thereof. The procedure is shown as a set of blocks that specify operations performed by the tools, such as through one or more modules or devices and are not necessarily limited to the orders shown for performing the operations by the respective blocks. In portions of the following discussion, reference may be made to the environment 100 of FIG. 1.

Figure 2:
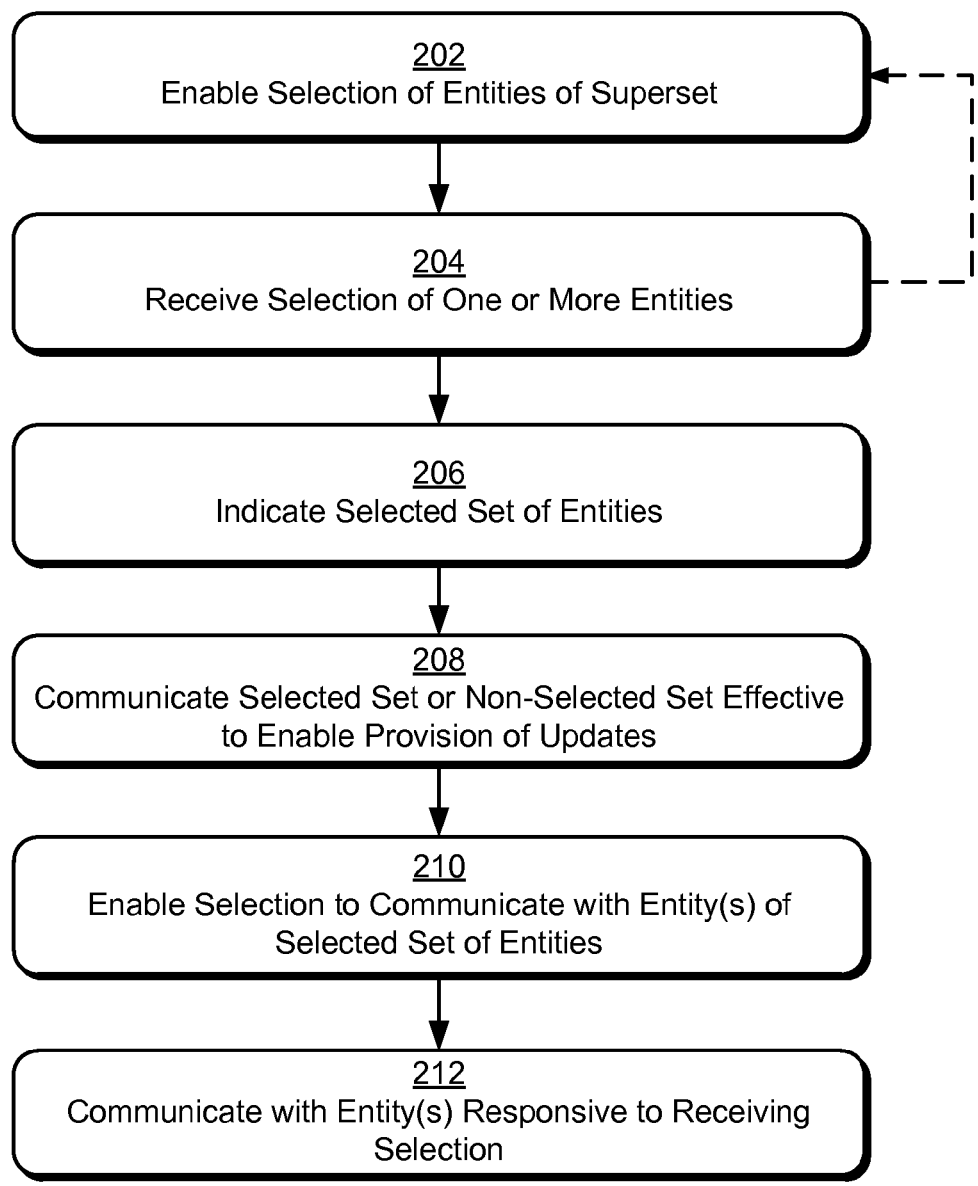
FIG. 2 is a flow diagram depicting a procedure in an example implementation by which the tools may act to enable a user to select entities effective to differentiate between those for which current updates are desired and those for which current updates are not desired, as well as communicate with those selected entities.

FIG. 2 depicts a procedure 200 in an example implementation in which the tools enable a user to select entities effective to differentiate between those for which current updates are desired and those for which current updates are not desired, as well as communicate with one or more entities of the selected set of entities. Example user interfaces and selection manners are described as part of this example procedure, though other user interfaces and selection manners are contemplated herein.

Block 202 enables selection of one or more entities of a superset of entities, such as by displaying selectable indicators for entities of the superset. These indicators may include icons, photographic images, text, and the like. The selection may be made through a search, entry of information indicating the selections, a gesture (e.g., slide, press and hold, or tap) or drag-and-drop with a stylus or finger on a display capable of receiving these types of input, or in other manners.

Consider again the example of Lydia Anderson, who has contacts (e.g., friends), feeds, and the like on her cellular phone. These are entities of her superset of entities 114. She would like to select from these entities to differentiate those for which she automatically receives current updates on her cellular phone and those for which she does not.

Figure 3:
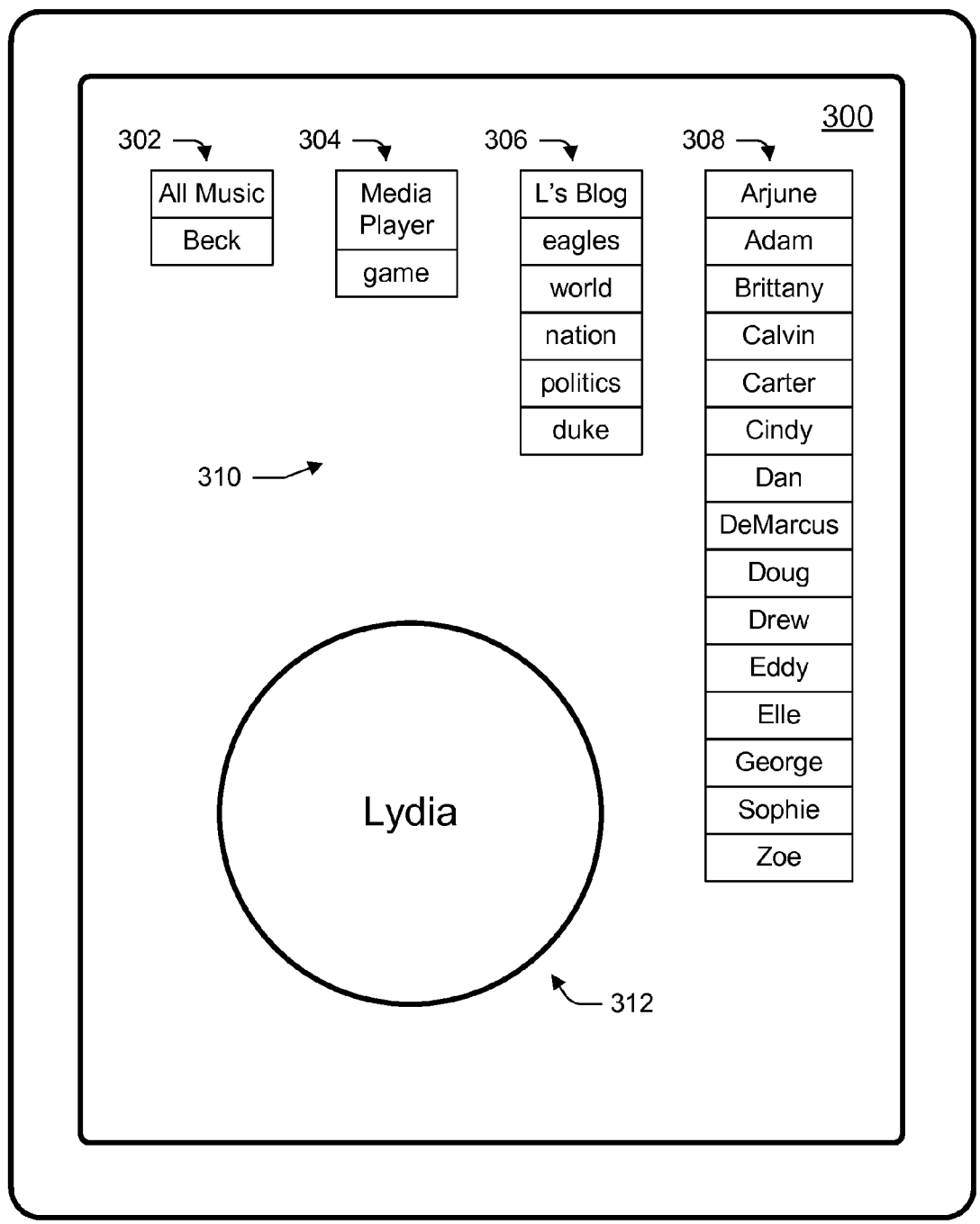
FIG. 3 illustrates an example user interface displaying and enabling selection of various entities of a superset of entities associated with a user.

By way of illustration consider FIG. 3, which shows an example user interface 300 displaying and enabling selection of two libraries 302, two software programs 304, six news feeds 306, and twelve contacts 308. Many more entities than these 22 shown here are contemplated but not displayed for brevity and visual clarity.

Block 204 receives selection of one or more entities of the superset of entities. The tools may receive these selections one-at-a-time, in groups, or all at once. If one-at-a-time or in groups the tools may repeat blocks 202 and 204 for additional selections, shown with a dashed line from block 204 to block 202.

This selection may be received through the user's mobile device or received from a remote source, such as a user selecting these entities through a network-enabled device communicating with computer server(s) 110 and/or mobile device 102. If received from a remote source the enabling of block 202 may be performed on the remote device or a device in communication with the remote device (e.g., server update module 124 of server computer(s) 110).

In the ongoing example the tools act, at blocks 202 and 204, through device update module 112 on mobile device 102 (here Lydia's cell phone). The device update module enables selection by drag-and-drop of indicators for the entities from one or more lists displayed in selection area 310 into selected set area 312. The selection area is labeled with the user's name ("Lydia").

Figure 4:
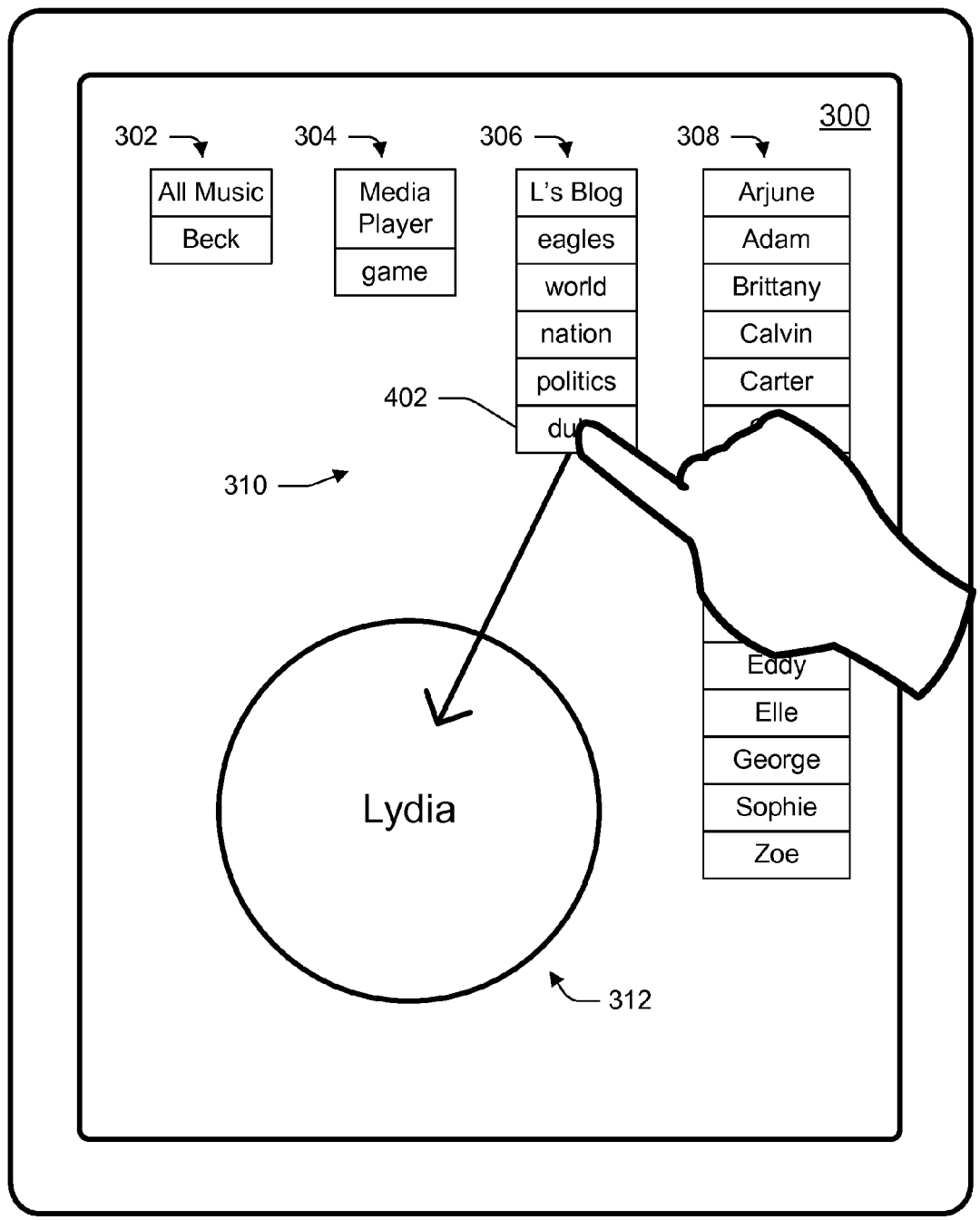
FIG. 4 illustrates an example drag-and-drop selection of an indicator also shown in FIG. 3.

FIG. 4 illustrates an example drag-and-drop selection, showing a fingertip 400 beginning to drag and drop indictor 402 for the duke news feed from selection area 310 to selected set area 312.

As noted, block 204 may receive many selections through various manners. Assume that here the tools received the indicator 402 for the duke news feed as well as indicators for Lydia's Media Player application, eagles news feed, and her contacts Arjune, Brittany, Calvin, DeMarcus, and Elle.

Figure 5:
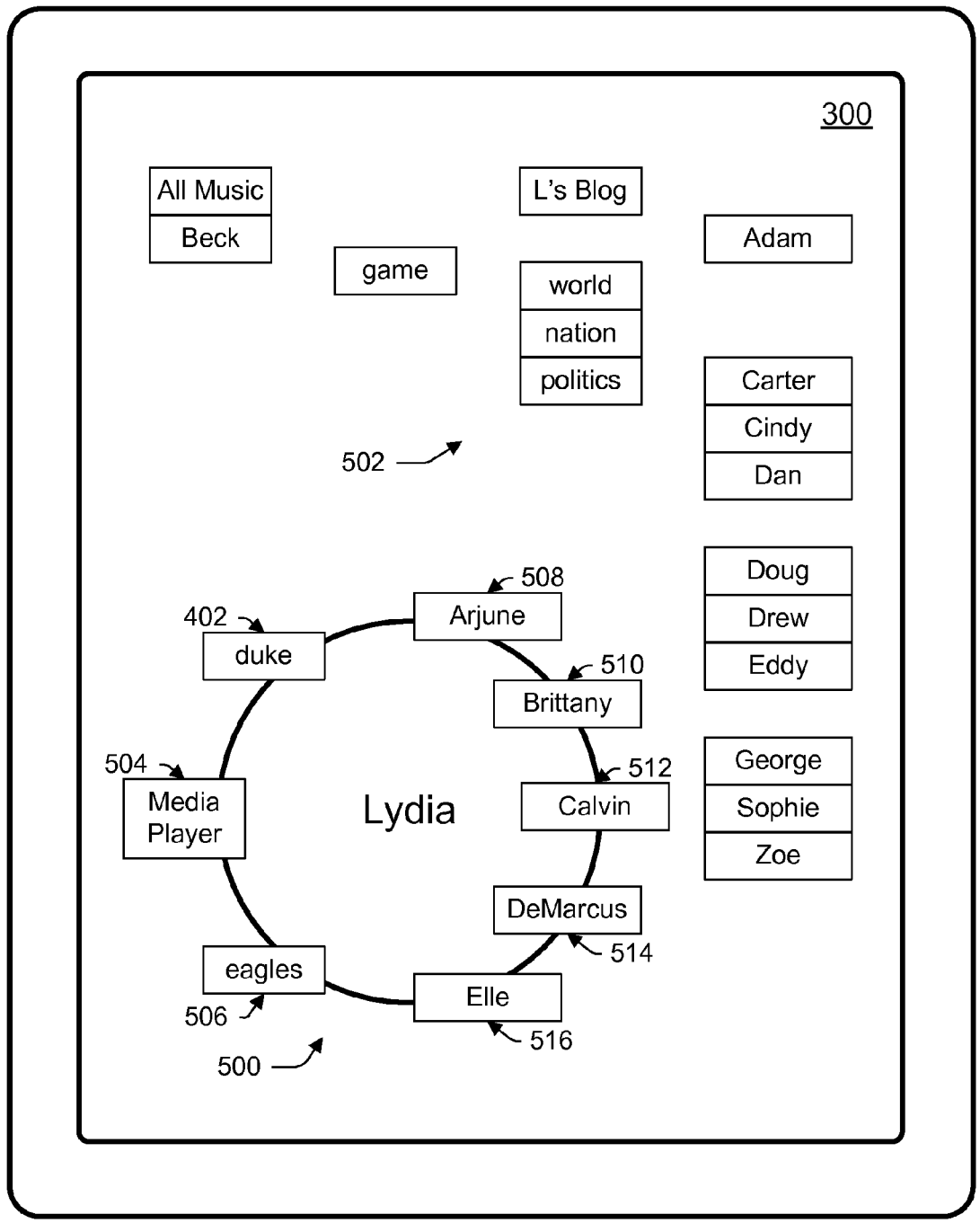
FIG. 5 illustrates an example user interface presenting indicators for selected entities orientated around a circle.

Block 206 indicates, such as on a display of the mobile device, the selected set of entities effective to visually differentiate the selected set of entities from the non-selected set of entities. Indicators for the entities of the selected set may be displayed all at once or in part. FIG. 5 illustrates the example user interface 300 of FIGS. 3 and 4 but presenting indicators for all of Lydia's selected entities in a circular orientation 500. Note that the tools indicate selection of these indicators/entities by removing indicators for the selected entities from the superset of entities. The remaining entities of the superset at 502 are non-selected entities (an example of non-selected set of entities 118 of FIG. 1). The tools also indicate that the selected entities are part of a selected set by displaying indicators for the selected entities, here the indicator 402 for the duke news feed and indicators for Lydia's Media Player application at 504, eagles news feed at 506, Arjune at 508, Brittany at 510, Calvin at 512, DeMarcus at 514, and Elle at 516.

Figure 6:
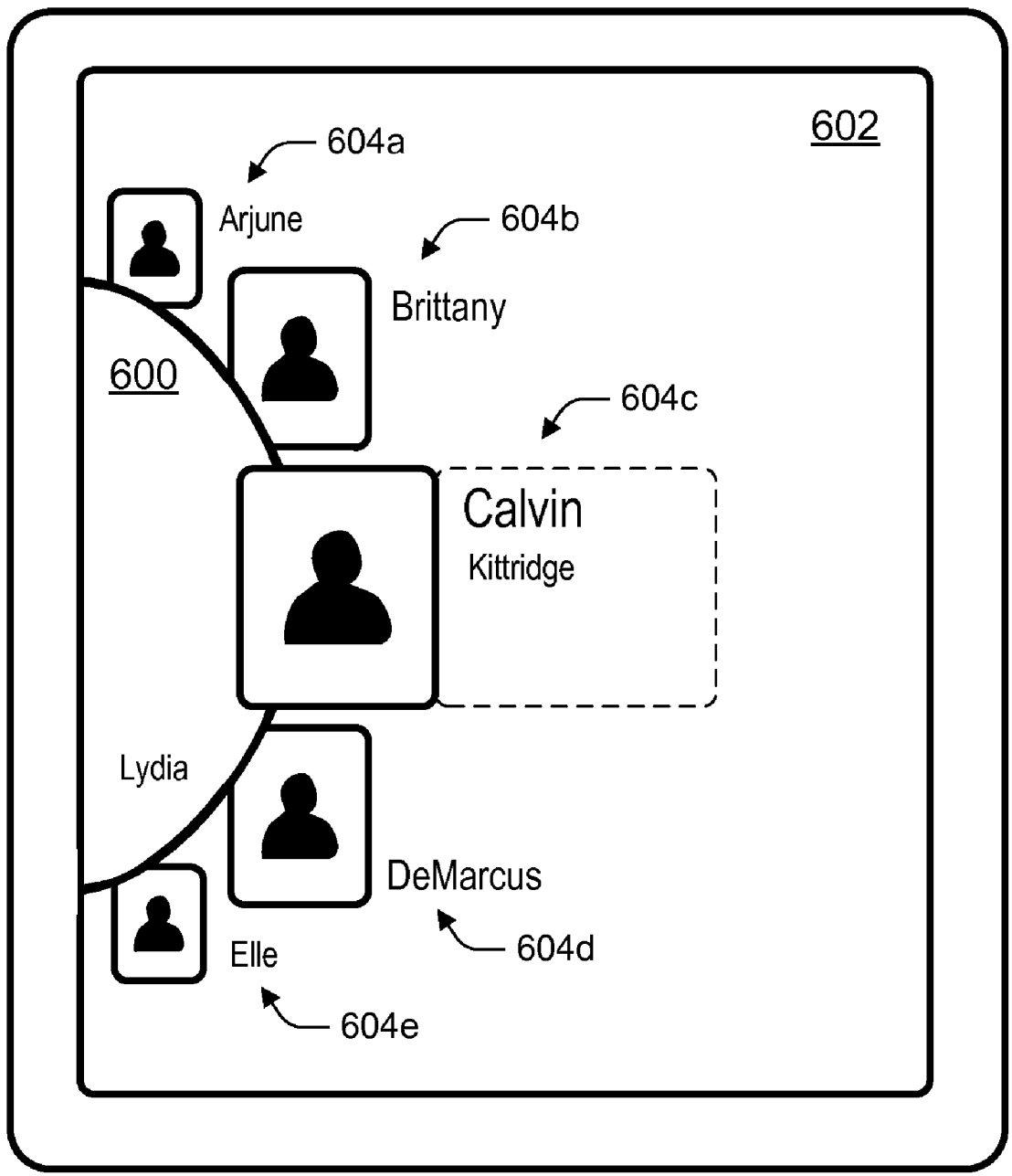
FIG. 6 illustrates indicators for entities of a selected set of entities, the indicators oriented around an arc and attached to a convex and arcuate shape.

Block 206 may present indicators for entities of the selected set oriented around an arc and/or convex shape, such as attached to a convex and arcuate shape 600 of graphical user interface 602 shown in FIG. 6. This graphical user interface indicates at least some of the selected entities; here indicators for Lydia's selected contacts are displayed but her media player and news feeds are not. Lydia's selected contacts, namely Arjune, Brittany, Calvin, DeMarcus, and Elle, have displayed indicators 604*a*, 604*b*, 604*c*, 604*d*, and 604*e*, respectively. Graphical user interface 602 may also enable selection of any of these entities easily and simply, such as through a single or multiple user input like a fingertip or stylus gesture on an indicator associated with an entity. Responsive to a selection, mobile device 102 may establish communication with such selected entity. This is further described below. Some advantages of such a user interface include that it enables a portion of the primary contacts to be displayed for easy access and provides an intuitive indication to the user by the use of the half circle that other contacts are also available and within easy reach. This minimizes the display area required to show all of the most important contacts to the user. In addition, once the user is familiar with the set of contacts who are part of the full circle (which may only be half shown at a given time), the design of this interface has the same effect as displaying the full circle as the user will most likely mentally complete the half circle into the full undisplayed circle of contacts when looking at the phone and access any of those contacts in the circle by spinning the circle around to the desired contact.

Additionally or alternatively, graphical user interface 602 may present updates or indicia thereof to a user such that the updates or indicia are visible-at-a-glance, easily accessible, and up-to-date. An example of this ability is described and illustrated below.

Figure 7:
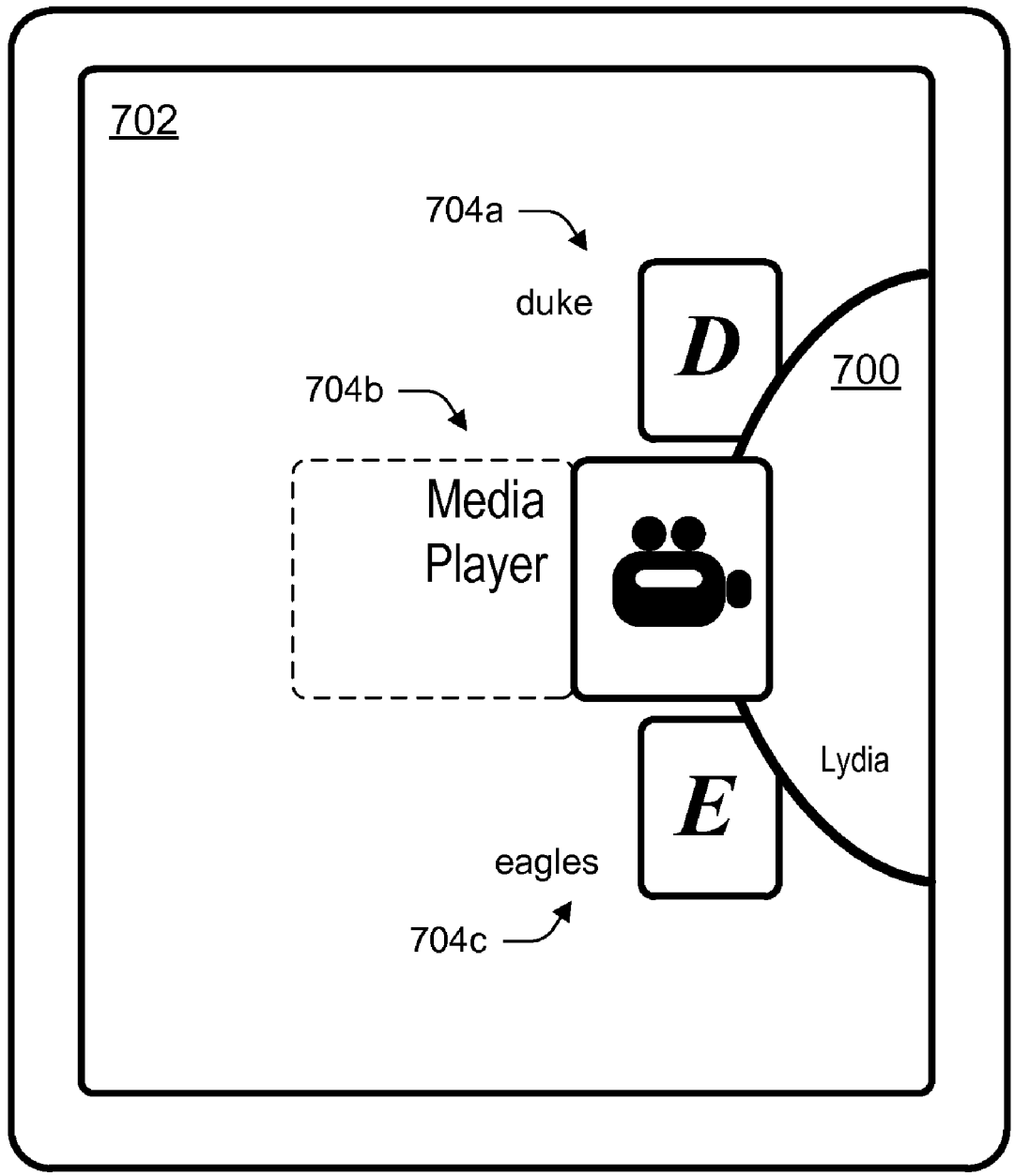
FIG. 7 illustrates indicators for other entities of a selected set of entities not shown in FIG. 6, these indicators oriented around an arc and attached to another convex and arcuate shape.

The other selected entities may be displayed similarly to those shown in graphical user interface 602, such as attached to another convex and arcuate shape 700 of graphical user interface 702 shown in FIG. 7. Indicators are displayed for each of these selected entities, indicator 704*a* for the duke news feed, 704*b* for the media player, and 704*c* for the eagles news feed. Note that all of these indicators of FIGS. 6 and 7 include icon indicators in addition to the text indicators shown in FIG. 5. These indicators may also include photographic images and other types of indicators as well.

Block 208 communicates the non-selected set or the selected set effective to enable provision, including without further user interaction (e.g., no user interaction other than the prior selecting of the entities into the set), of current updates provided for the entities of the selected set and not provide without further user interaction updates provided for the entities of the non-selected set.

In the case of selections made through mobile device 102, device update module 112 communicates information to a remote entity remote from the mobile device, the communicating using a mobile communications network. The remote entity may include server computer(s) 110 and/or server update module 124 and the mobile communications network may include network 108. This communication of information is effective to enable the server computers and server update module 124 to determine to provide, over a mobile communications network, automatically, and without further user interaction, current updates provided for the entities of the selected set and not provide without further user interaction updates provided for the entities of the non-selected set.

Figure 8:
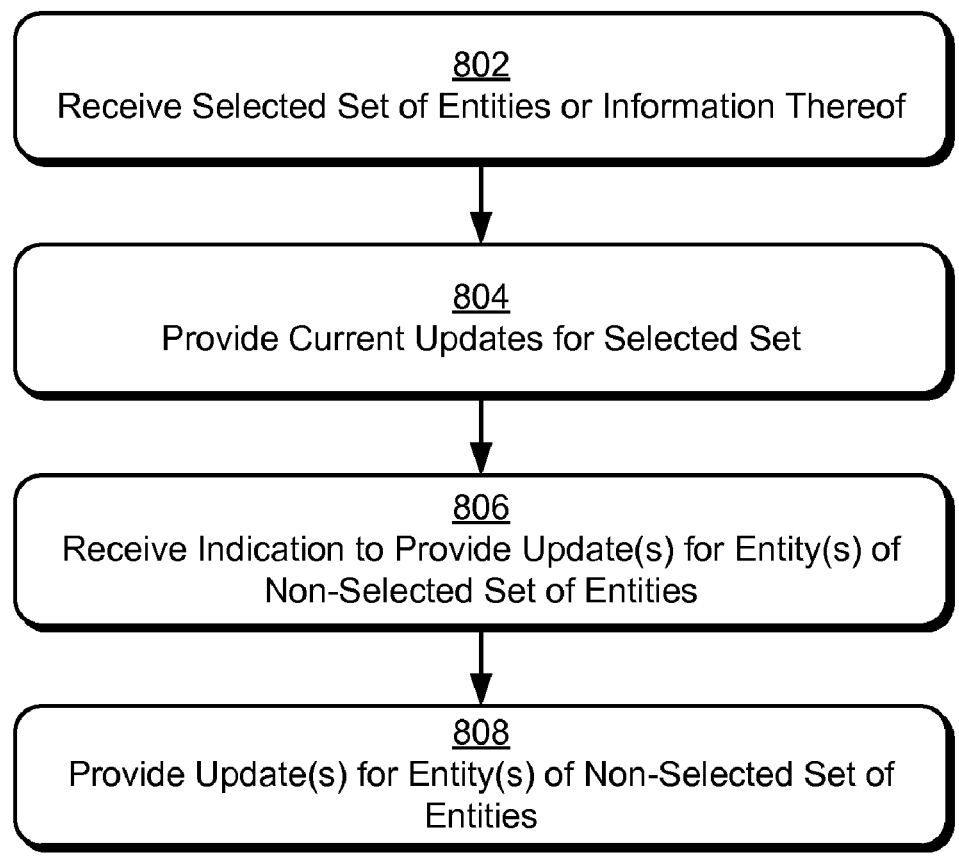
FIG. 8 is a flow diagram depicting a procedure in an example implementation by which the tools may provide current updates for a selected set of entities and forgo doing so for a non-selected set of entities, as well as other actions.

The tools, as illustrated and described in greater detail below, may provide current updates for the selected set of entities, such as by displaying such updates or indicators thereof on any of user interfaces 500, 602, or 702 of FIGS. 5, 6, and 7. Provision of updates is also described as part of procedures 800 and 900 of FIGS. 8 and 9, respectively.

Returning to procedure 200, the tools may proceed to block 210 to enable selection by the user to communicate with an entity of the selected set of entities. The tools may do so responsive to as little as a single user input, such as a gesture with a finger or stylus on a displayed indicator (e.g., Arjune, Brittany, Calvin, DeMarcus, and Elle, which have display indicators 604*a*, 604*b*, 604*c*, 604*d*, and 604*e*, respectively, in FIG. 6). Responsive to receiving such a selection, the tools may communicate with the selected entity at block 212. This communication may include a call (voice alone or voice and video), instant message, sharing of a file (e.g., photo, video, and music), a "nudge" or "poke" (a one-button command to send a simple message like "I'm thinking of you"), or text message, to name a few.

As noted at block 208, the tools communicate the selected set of entities or information sufficient to differentiate the selected set of entities from the non-selected set to some entity. Procedure 800 of FIG. 8 may receive this information at block 802, though procedure 800 may also be separable and independent from procedure 200. In either case, the following discussion describes ways in which the tools may provide current updates for the selected set of entities and forgo doing so for the non-selected set. Aspects of this procedure may be implemented in hardware, firmware, or software, or a combination thereof. The procedure is shown as a set of blocks that specify operations performed by the tools, such as through one or more modules or devices, and are not necessarily limited to the orders shown for performing the operations by the respective blocks. In portions of the following discussion, reference may be made to the environment 100 of FIG. 1 and the ongoing example(s).

Block 802 receives a selected set of entities of a superset of entities associated with a user or information sufficient to differentiate the selected set of entities from non-selected entities of the superset of entities. This information may be received from a user using a mobile or other type of device, including the information communicated at block 208. The tools may act through server computer(s) 110 and server update module 124, such as in the ongoing example of Lydia Anderson.

Continuing this example, the server update module at block 802 receives Lydia's selected set of entities from mobile device 102 through a mobile communications network (e.g., network 108).

Block 804 provides current updates for each of the selected entities to a mobile device associated with the user and forgoes providing current updates for the non-selected entities, the providing effective to enable the mobile communication and computing device to display current updates for the selected entities.

Block 804 may also provide current updates in real-time and automatically, such as by passively receiving updates for entities, determining which of those entities are selected entities, and for those that are, providing such updates as they are received to the user's mobile device and through a mobile communication network.

Block 804 may also retrieve updates for selected entities at particular times or periodically, such as stock quotes for a selected stock-quote-providing entity whenever those stock quotes are expected to be available (e.g., every 15 minutes during business hours). Whether passive or active in receiving or retrieving updates, the tools provide updates effective to enable the mobile device to display updates or indicia thereof to a user in real-time and automatically. Note that the tools, by forgoing provision of updates for non-selected entities, may save power resources of a mobile device and/or bandwidth resources of the mobile network that would have been used if the mobile device were provided current updates for the non-selected entities of the superset of entities.

Continuing the ongoing example, consider Lydia Anderson's selected entities. The server update module may receive these responsive to Lydia selecting them on her cellular phone and the phone communicating them to the server computer(s). Assume that at some future time the server update module receives updates for Cindy, the duke news feed, world news feed, Calvin, and Elle. The server update module then determines that Lydia does not want current updates for Cindy and the world news but does for the duke news feed, Calvin, and Elle based on Lydia's prior selections. The server update module then provides the updates for the duke news feed, Elle, and Calvin to Lydia's cellular phone. Here Lydia's cellular phone and her communications network are not burdened with receiving and communicating updates for Cindy and the world news. Ways in which Lydia's cellular phone or other mobile devices may act based on receiving this information are described elsewhere herein (e.g., procedure 900).

Procedure 800 may end at block 804 or continue to block 806. Block 806 receives an indication to provide update(s) for one or more of the non-selected entities of the superset of entities. This indication may come in the form of an explicit request made by the user of the mobile device or the device itself. The user may select to receive updates stored or accessible by server computer(s) 110 for a non-selected entity for which the user would otherwise not receive updates. Assume here that Lydia selects to receive all of the updates for her world news feed and that an indication of this is received by server update module 124 at block 806.

The request may also be made by the mobile device but not made by its user, such as when the device recognizes that it is now powered by a non-battery source and thus may receive updates without draining its battery. Lydia, for example, may have plugged her cellular phone into its charger.

The indication received by block 806 may be from another source and responsive to occurrence of an event (rather than a request from a user or a user's device), such as when network 108 determines that it has unused bandwidth with which to communicate the updates for non-selected entities. It may also be on a combination of these, such as when the device is on a free network or is not on battery power at the same time as when the network has this unused bandwidth.

Block 808, responsive to receiving this indication, provides one or more updates for one or more non-selected entities. Thus, if Lydia requests to receive updates for her world news feed, the server update module may receive this request and provide all of the world news updates to Lydia's cellular phone that Lydia's phone has not previously received.

Example Procedure for Providing Updates

Figure 9:
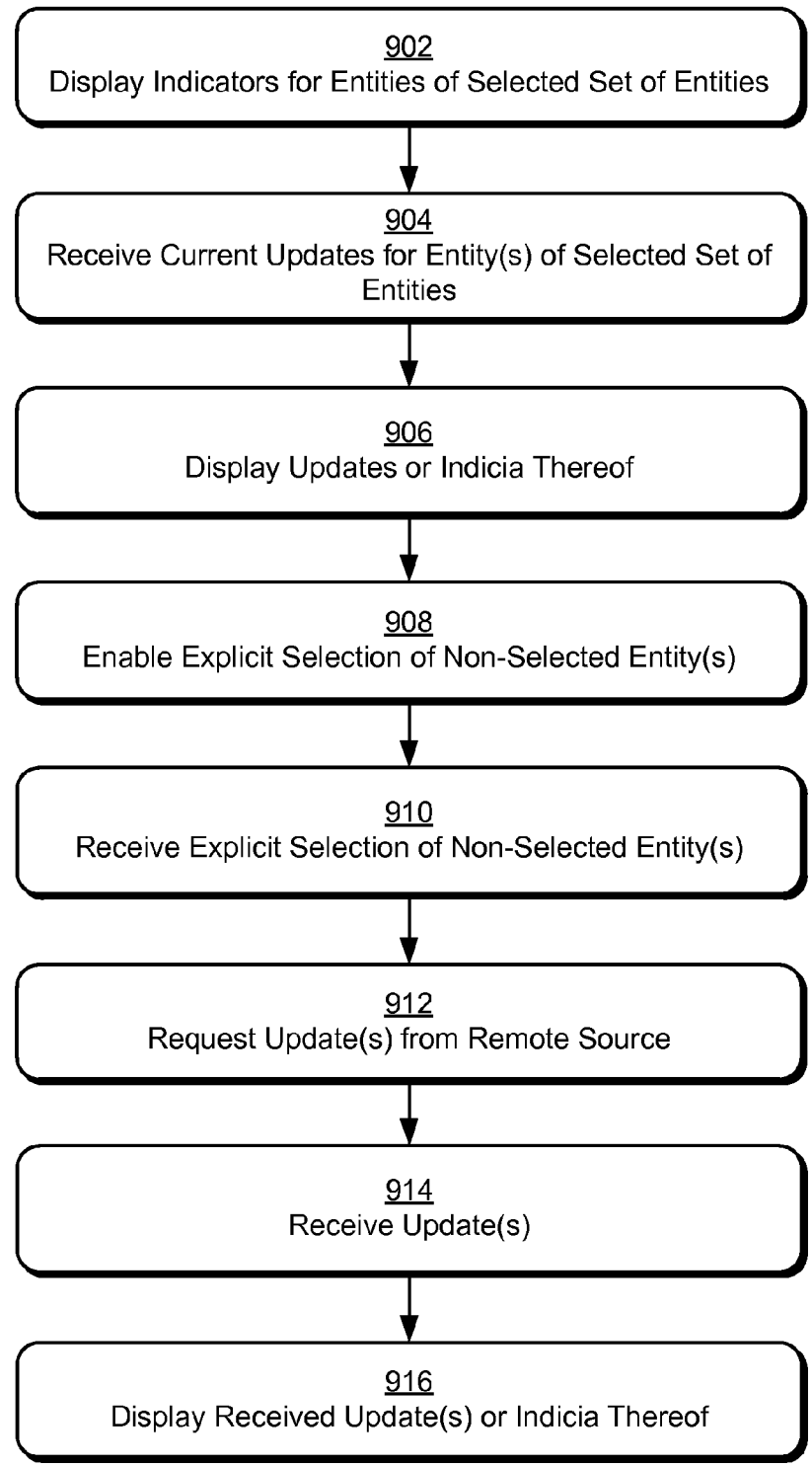
FIG. 9 is a flow diagram depicting a procedure in an example implementation by which the tools may provide updates to a user of a mobile device.

The following discussion describes ways in which the tools may provide updates to a user of a mobile device, shown as procedure 900 of FIG. 9. Aspects of this procedure may be implemented in hardware, firmware, or software, or a combination thereof. The procedure is shown as a set of blocks that specify operations performed by the tools, such as through one or more modules or devices, and are not necessarily limited to the orders shown for performing the operations by the respective blocks. In portions of the following discussion, reference may be made to the environment 100 of FIG. 1, procedures 200 or 800, and the ongoing example.

Block 902 displays, on a display of a mobile device, indicators for entities selected from a superset of entities. The tools may do so similarly as to that described according to block 206 of procedure 200 and illustrated at FIGS. 5, 6, and/or 7.

Block 904 receives current updates for the entities selected from the superset of entities and for which indicators may be displayed. These updates may be received automatically and without user interaction for entities of a selected set of entities, which may be displayed in part or in total on a mobile device. Block 904 may receive these updates from a remote source, such as server computer(s) 110 sending updates as shown at block 804 of procedure 800.

Continuing the ongoing example, Lydia's cellular phone may receive, in real-time and automatically, current updates for her duke news feed and her friends Calvin and Elle.

Block 906 displays each of the current updates or indicia thereof on the display and visually associated with the indicator for the entity for which each of the current updates is received. The tools may act to display these updates such that they are visible at-a-glance, up-to-date, and easily accessible.

Figure 10:
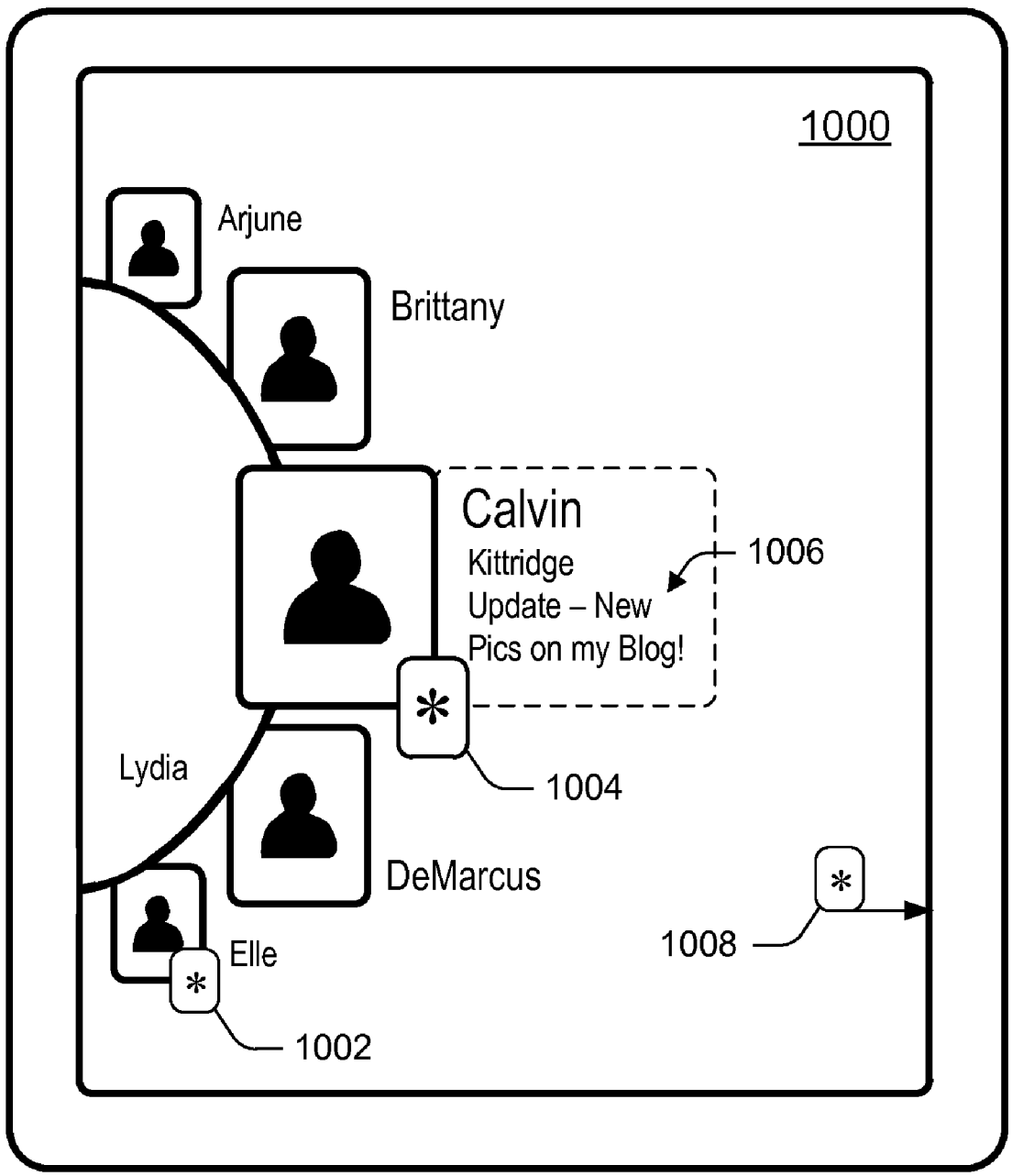
FIG. 10 illustrates an example user interface similar to that shown in FIG. 6 but showing indicia for current updates and an actual current update.

By way of example, see FIG. 10, which provides a graphical user interface 1000 similar to that of graphical user interface 602 of FIG. 6 but showing indicia for an update for Elle at 1002 and indicia for an update for Calvin at 1004, as well as the actual update itself for Calvin at 1006, here because his indicator is more-prominently displayed than that of Elle's. Note also that the update for Lydia's duke news feed is not shown but an indicator 1008 indicates that an update has been received for one of her non-person entities (those of FIG. 7). The substance of the update for Elle or duke may be displayed without further user interaction, though with a small display typically used on many mobile devices a selectable indicator showing that an update is received and that, if selected or if the entity is made more prominent (e.g., moving Elle to Calvin's location in the user interface), will cause the device to show the substance of the update, is instead used in this example.

Block 908 enables explicit selection to receive an update for an entity of the superset of entities that is not one of the selected entities and for which current updates are not received automatically and without user interaction. The tools permit a user to select and receive updates for non-selected entities, such as Cindy or the world news in the above example. This can be from explicit selection, such as from the user, or based on some indication (as noted in procedure 800 above).

Figure 11:
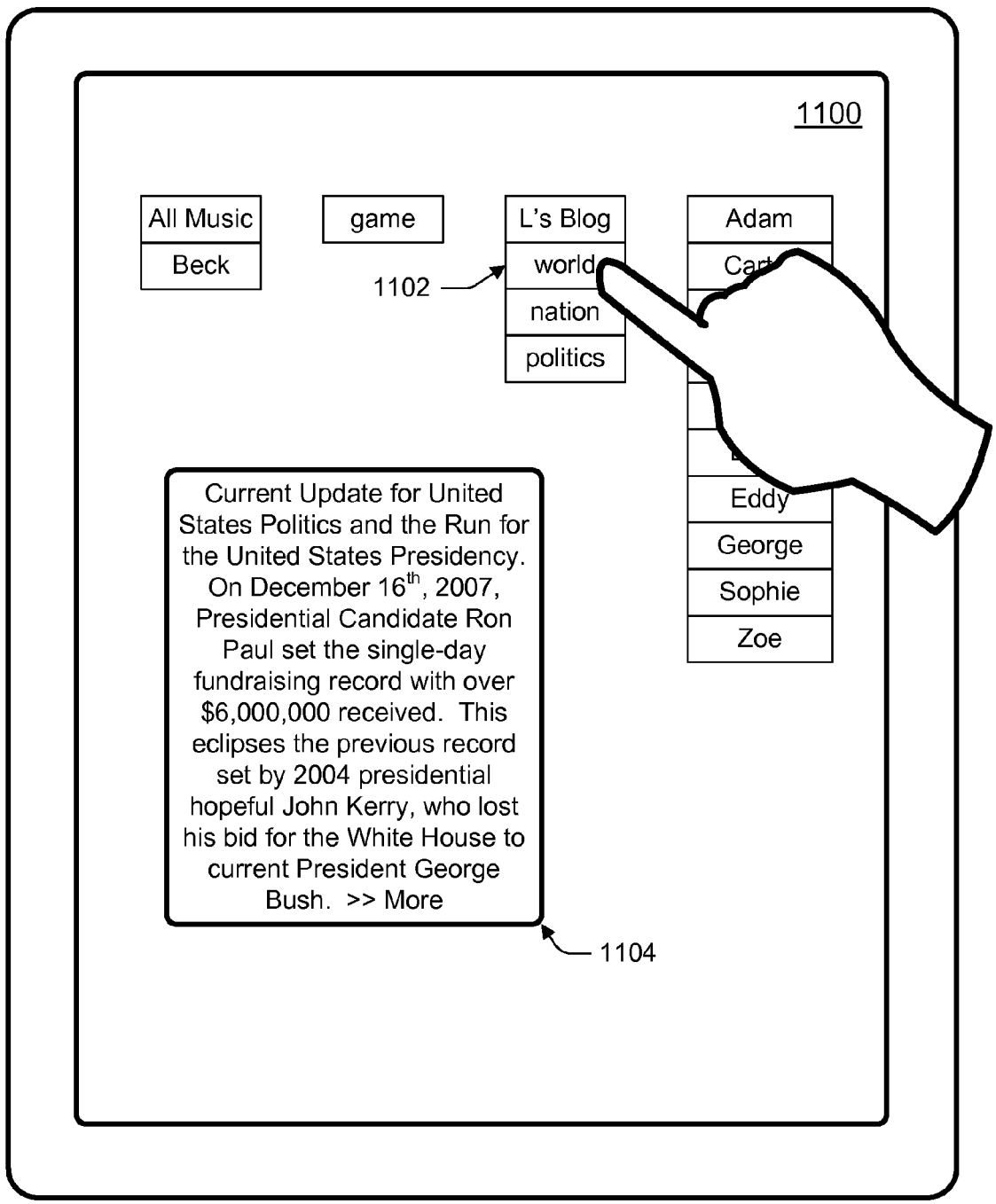
FIG. 11 illustrates an example user interface presenting selectable indicia for non-selected entities and an update provided in response to selection of one of those indicia.

Consider user interface 1100 of FIG. 11, in which Lydia's cellular phone presents entities of the non-selected set of entities. Lydia may select from these in various manners noted above for selecting indicia, here with a single gesture (e.g., a tap) of a finger tip 400 on indicia 1102 for the world news feed.

Block 910 receives selection of a non-selected entity. Here assume that Lydia selects to receive updates for her world news feed.

Block 912 requests from a remote source and through a mobile communication network update(s) for one or more entities of a non-selected set of entities (non-selected to receive ongoing current updates but possibly selected for an update at a particular time). As noted above, the request may be responsive to receiving an explicit request (e.g., at block 910) or may be based on some other criteria, such as the mobile device being powered by a non-battery source. In this example it is responsive to an explicit request.

Block 914 receives update(s) for one or more entities of the non-selected set of entities. The tools may receive these updates from server update module 124 of FIG. 1 and for one, some, or all of the non-selected set of entities 118. As noted above, the updates may be received responsive to some other type of indicator other than a request, such as on occurrence of an event.

Block 916 displays the received update(s) or indicia thereof on the display of the mobile device. Similarly to that of block 906, the tools may display updates or indicia indicating that an update is received. If a particular entity is selected, the tools may present the substance of the update rather than or in addition to indicia thereof. Consider again, for example, FIG. 11, in which a portion of the substance of an update for Lydia's world news feed is displayed at 1104 responsive to Lydia's request to receive an update.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile device comprising:
a display device;
one or more processors;
one or more computer-readable storage media storing instructions, that when executed via the one or more processors, implement a device user interface configured to: display, on the display device, multiple icons representing selected entities that are selected from a superset of entities including at least application programs and contacts associated with the mobile device that are arranged around different respective arcuate shapes in the device user interface, the selected entities designated to receive current updates automatically and without user interaction;
detect availability of current updates associated with one or more of the selected entities;
present selectable update indicators visually associated with respective icons to represent the availability of the current updates for the one or more of the selected entities including updates available for the application programs and contacts, the selectable update indicators selectable to cause the mobile device to show substance for corresponding current updates; and
output a current update for an entity responsive to selection of a corresponding selectable update indicator.

2. The mobile device as recited in claim 1, wherein the device user interface is further configured to enable drag and drop selection of the selected entities from the superset of entities.

3. The mobile device as recited in claim 1, wherein the superset of entities from which the selected entities are selected further includes a communication group designating persons to receive electronic messages as a group from the mobile device.

4. The mobile device as recited in claim 3, wherein the superset of entities from which the selected entities are selected further includes an updatable data library of the mobile device.

5. The mobile device as recited in claim 4, wherein the superset of entities from which the selected entities are selected further includes update feeds.

6. The mobile device as recited in claim 1, wherein the current updates available to said selected entities comprise contact data, a text or image, a software program update, a group message, a library update, or a Real Simple Syndication (RSS) feed.

7. The mobile device as recited in claim 1, wherein the device user interface is further configured to: obtain and display a requested update for a non-selected entity of the superset of entities in response to receiving explicit user input to request an update for the non-selected entity.

8. The mobile device as recited in claim 1, wherein the device user interface is further configured to:
receive a selection of the selected entities from the superset of entities; and
configure current updates to occur automatically and without user interaction for the selected entities.

9. The mobile device as recited in claim 1, wherein to present selectable update indicators comprises presenting the update indicators for multiple different types of entities together in the user interface to provide visible at-a-glance indications of available current updates.

10. The mobile device as recited in claim 1, wherein to receive a selection comprises displaying via the device user interface a selection area to list the superset of entities and a selected set area into which entities from the list are moved to cause the selection of the entities.

11. One or more computer-readable memory devices having computer-readable instructions therein that, when executed by a mobile device, implement a device update module on the mobile device operable to:
display, on a display of the mobile device, multiple icons representing selected entities that are selected from a superset of entities including multiple different types of entities, such that icons corresponding to a first type of entity are oriented around a first arcuate shape in a user interface of the mobile device and icons corresponding to another type of entity are oriented around another arcuate shape in the user interface of the mobile device, the selected entities designated to receive current updates automatically and without user interaction;
detect availability of current updates associated with one or more of the selected entities;
present selectable update indicators:
visually associated with respective icons to provide visible at-a-glance indications of the availability of the current updates for the one or more of the selected entities; and
each selectable to cause display on the display of the mobile device of at least some content of a corresponding current update; and
output a current update for a selected entity responsive to selection of a corresponding selectable update indicator.

12. One or more computer-readable memory devices as recited in claim 11, wherein the superset of entities from which the selected entities are selected includes application programs, contacts, and update feeds associated with the mobile device.

13. One or more computer-readable memory devices as recited in claim 11, where the device update module is further operable to present an update for a non-selected entity of the superset of entities in response to receiving explicit user input to request the update for the non-selected entity.

14. A method implemented by a mobile device comprising:
detecting at the mobile device availability of updates associated with one or more selected entities that are selected from a superset of entities to receive current updates automatically and without user interaction;
displaying on the mobile device a user interface having multiple icons representing the selected entities and visually associated with respective selectable update indicators to represent the availability of the updates for the one or more of the selected entities, such that icons corresponding to contacts are oriented around a first arcuate shape in the user interface of the mobile device and icons corresponding to other types of entities are oriented around another arcuate shape in the user interface of the mobile device, the selectable update indicators associated with the multiple icons selectable to present substance of corresponding updates via the user interface;

outputting via the user interface of the mobile device an update for an entity responsive to selection of a corresponding selectable update indicator; and presenting via the user interface of the mobile device an update for a non-selected entity of the superset of entities in response to receiving explicit user input to request the update for the non-selected entity.

15. The method of claim 14, further comprising:

exposing a selection user interface to enable selection of the selected entities by drop and drag selection of the selected entities from the superset of entities into a selected set area of the user interface;

receiving a selection of the selected entities via the selection user interface; and configuring current updates to occur automatically and without user interaction for the selected entities.

16. The method of claim 14, wherein the superset of entities includes at least application programs and contacts associated with the mobile device.

17. The method of claim 14, wherein the superset of entities includes application programs, contacts, communication groups designating persons to receive electronic messages as a group from the mobile device, and update feeds associated with the mobile device.

* * * * *